Oct. 15, 1963  C. E. ROSSELET  3,107,076
MEANS FOR ATTACHMENT BY FASTENING-CLIP
Filed April 28, 1961  2 Sheets-Sheet 1

Inventor
CLAUDE ROSSELET
By Toulmin & Toulmin
Attorneys

Oct. 15, 1963  C. E. ROSSELET  3,107,076
MEANS FOR ATTACHMENT BY FASTENING-CLIP
Filed April 28, 1961  2 Sheets-Sheet 2

Inventor
CLAUDE ROSSELET
By Toulmin & Toulmin
Attorneys

# United States Patent Office 3,107,076
Patented Oct. 15, 1963

3,107,076
MEANS FOR ATTACHMENT BY
FASTENING-CLIP
Claude E. Rosselet, Founex, near Nyon, Switzerland, assignor to Sarmi S.A., Societe d'Applications de Recherches Minieres et Industrielles, Lenzerheide (Grisons), Switzerland, a Swiss company
Filed Apr. 28, 1961, Ser. No. 106,333
Claims priority, application Switzerland May 5, 1960
10 Claims. (Cl. 248—71)

The present invention relates to fastening-clips for the mounting on walls of piping systems of all types (water conduits, gas pipes, electric conductors whether ironclad or not, tubing for electric conductors, etc.). It is known that the clips at present in use usually comprise a bottom half-clip fitted with a base member or end-piece which is tapped for the purpose of being fixed by screwing on the threaded head of a fixing rod, and a top half-clip or head-piece, the two-half clips being additionally provided with pierced and tapped feet or raised ends for the purpose of closing the clip and tightening it by means of screws.

The cost price of this type of clip is relatively high on account of the various operations made necessary by its manufacture. The use of such a clip additionally involves relatively substantial installation costs (screwing, unscrewing, etc.).

The present invention has for its object to overcome these disadvantages and the fastening clip which forms the object of the invention is especially characterised in that it comprises a bent and deformable strip provided with an opening through which can be inserted a fixing means having a retaining head to which the said strip is designed to be coupled by interlocking, and at least one extremity arranged to receive means for closing and clamping the said clip over the element which it is required to fasten, while this clamping action has the effect at the same time of immobilizing the clip with respect to the surface on which it is mounted.

In its preferred form of embodiment the fastening clip comprises a single bent strip constituting the clip body which has the general shape of an S, the top portion of which, namely that portion which is furthest away from the surface against which the clip is designed to be applied, is intended to receive the element which the clip is required to hold, while the bottom portion of the S or in other words that portion which is nearest to the surface referred-to above, is adapted on the one hand to permit the insertion of the fixing member with retaining head which is applied against the intermediate arm of the S-shaped strip, is on the other hand arranged to admit one extremity of pivoting means for closing and tightening the clip, the other extremity of the said means being brought into engagement with the top arm of the strip mentioned above.

The fastening clip is further characterized by the following points:

The bottom portion of the S-shaped strip has an angular shape and is provided with a small face which is substantially perpendicular to the surface on which the clip is mounted;

That extremity of the S-shaped strip which is required to come into contact with the surface on which the clip is mounted, is folded down at the exterior and is preferably provided with anchoring teeth;

The bottom arm of the S-shaped strip is provided with an oblong hole for the free insertion of the fixing member, while the intermediate arm of the said strip if provided with an elongated slot for the insertion of the retaining head of the fixing member;

The closing and tightening means consist of an elbowed rod, one of the arms of which, being engaged in a hole formed in the small face of the bottom portion of the S-shaped strip, is provided with retaining ears which in fact prevent the said rod from passing accidentally out of the hole in which are formed notched portions through which the said ears are intended to be inserted inside the said hole and in a well-determined angular position, while the other arm of the rod is threaded so as to receive a tightening nut applied against the free top arm of the said strip;

That arm of the elbowed rod which is provided with retaining ears has a length which is such as to prevent the accidental disengagement of the retaining head of the fixing member;

The extremity of the free arm of the strip is provided with a transverse slot for permitting the engagement of the threaded end of the elbowed rod as a result of the simple pivotal movement of the said rod about the geometrical axis of that arm of the rod which is provided with retaining ears;

Irrespective of the design of the fastening clip proper, the means for fixing and retaining the clip consist of a pin which is rigidly fixed to the wall on which the clip is intended to be fastened, the said pin being provided with a retaining head and an auxiliary head or annular flange which limits the depth of penetration of the pin.

Further special features and characteristics of the present invention will be brought out by the description which follows below and which relates to an example of preferred design of the new fastening clip, the said example being given solely by way of indication without any limitation being implied and is illustrated diagrammatically in the accompanying drawings, in which.

Figure 2:
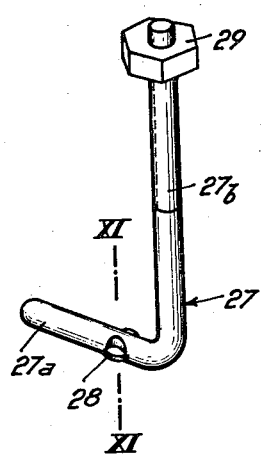
FIG. 2 is a view in perspective of the elbowed rod which constitutes the means for closing and tightening the clip of FIG. 1.
Figure 10:
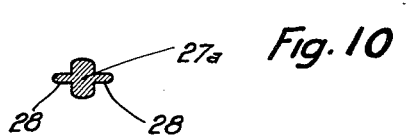

Lastly, FIG. 10 is a view in transverse cross-section of the rod, taken along the line XI—XI of FIG. 2.

In its preferred form of embodiment, the clip body is a strip 21 having the general shape of an S, the top rounded portion 21a of which is intended to hold the element A to be secured while the lower portion 21b of the said strip is angular and is provided with a face 21c substantially at right angles to the surface P against which the clip is intended to be held.

The extremity of the top arm of the strip is provided with a transverse slot 22 for the purpose of receiving the top extremity of the closing and clamping member which will be described below, while the lower arm of the strip terminates in an externally flanged portion 21d on which are formed anchoring teeth 23.

In the lower arm of the S-shaped strip there is formed an oblong hole 24 providing for the free insertion of the fixing member which will be described below, whereas there is formed in the intermediate arm of the said strip a button-hole slot 25 for the purpose of engaging and inserting the retaining head of the fixing member.

The face 21c is pierced with a hole 26, at the edge of which are formed two notched portions 26a which are diametrically opposite to each other.

Figure 3:
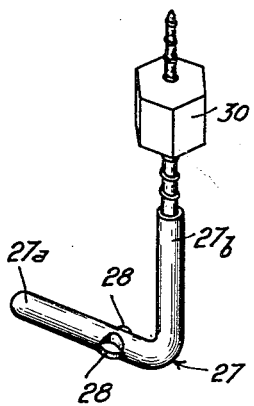
FIG. 3 is a view in perspective of an alternative form of the elbowed rod.
Figure 9:
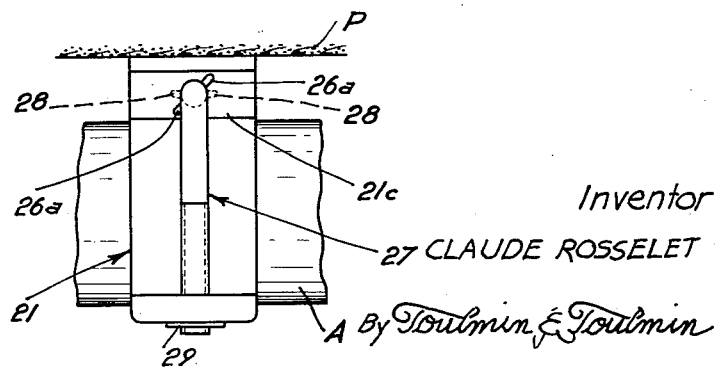
FIG. 9 is a view similar to the two preceding views, the member to be secured being placed in position inside the clip and the elbowed rod having been brought by pivoting through an angle of 90° into the closing and clamping position.

The closing and clamping member is constituted by a rod 27 which is elbowed at a right-angle as shown in FIG. 2, the small arm 27a of which is provided with two retaining ears 28 as shown also in FIG. 9, which are preferably formed by die-stamping and adapted to pass through the notched portions 26a when the rod 27 is located in a pre-determined angular position. The long arm 27b of the said rod is either threaded as a metal screw so as to receive a nut 29 or as a wood screw, as shown in FIG. 3, so as to receive a self-tapping plastic nut 30.

The fixing member is preferably constituted by the fixing pin 5.

Instead of a fixing pin of this kind, it is obviously possible to employ an ordinary nail or screw, etc., the head of which is held at the proper distance away from the surface on which the fastening clip is to be mounted.

Figure 4:
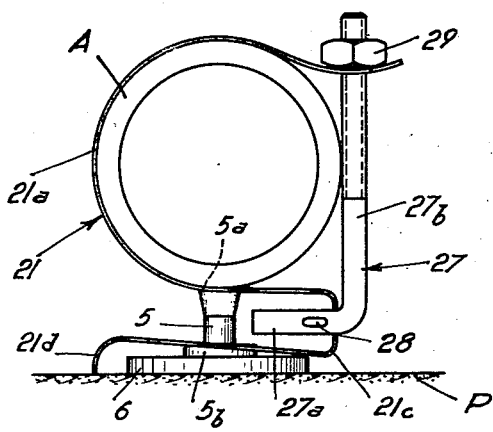
FIG. 4 is a view in elevation of the complete fastening clip securing a tube.

The combination of the clip and the element A which the said clip is designed to attach to a wall P is illustrated in FIG. 4, in which the bottom arm of the clip body is shown as bearing on a washer or base member 6.

FIGS. 5 to 9 show the different phases of installation of the fastening clip.

Figure 5:
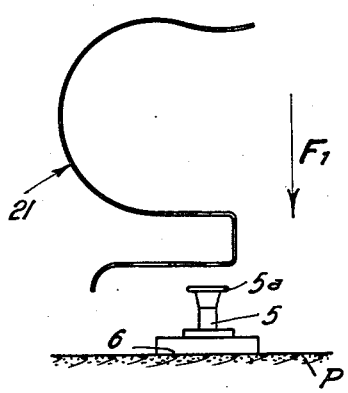
FIG. 5 is a view in elevation of the S-shaped strip ready to be inserted over the fixing member.
Figure 6:
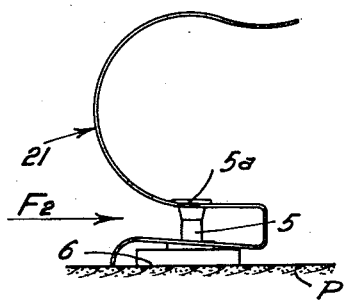
FIG. 6 is a view similar to the preceding, the strip being fitted on to the fixing member.

After driving-in the pin 5 and thus clamping the base member 6 against the wall P, the said pin 5 is surmounted by the clip 21 which is displaced as shown in FIG. 5 in the direction of the arrow F1, while making sure that the head 5a passes through the oblong hole 24 and through the circular portion of the button-hole slot 25. By means of a movement of translation in the direction of the arrow F2 as shown in FIG. 6, the fastening clip is made to slide against the wall P until the pin 5 reaches the end of the slotted portion of the button-hole slot 25, the head 5a being thus located above the central arm-section of the strip.

Figure 7:
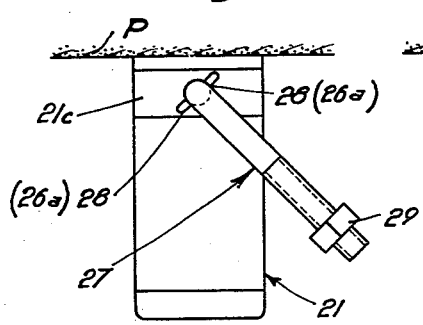
FIG. 7 is a view at right angles to FIG. 6 with the elbowed rod in course of being assembled by fitting into the strip.
Figure 8:
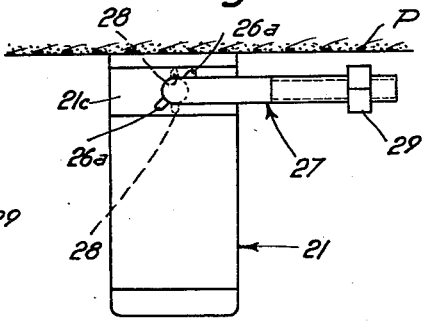
FIG. 8 is a view similar to the preceding, the elbowed rod being engaged and locked inside the strip.

When once the clip body has been fitted over the pin 5, the arm 27a of the elbowed rod 27 is engaged in the orifice 26 of the face 21c, the said arm 27a of the said elbowed rod being held in a pre-determined angular position, as shown in FIG. 7, this position being such that the retaining ears 28 are able to pass through the notched portions 26a of the hole 26, following which the said rod 27 is caused to pivot, for example into the position illustrated in FIG. 8, thereby resulting in the locking of the rod inside the fastening clip.

The said fastening clip can thus remain idle in this position until the time of mounting the element A to be secured. The rod 27 is not liable to become detached and, in view of the length of the arm 27a of the said rod, the clip cannot move back with respect to the fixing pin 5 and cannot therefore fall off accidentally.

Figure 1:
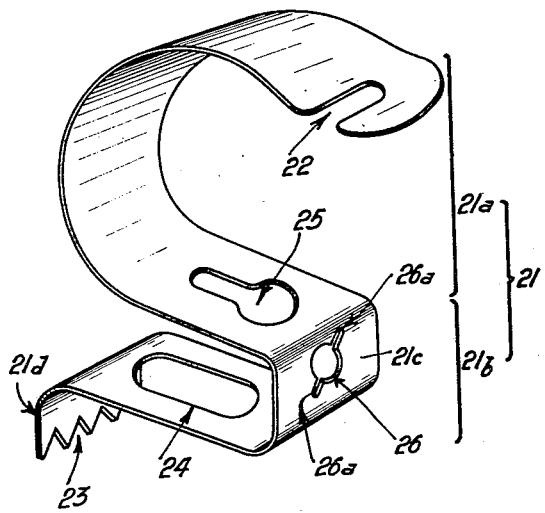
FIG. 1 is a view in perspective of a particular arrangement in which a strip in the shape of an S is probided so as to constitute the body of the clip.

When once the element A to be secured has been placed in position in the upper portion of the clip, the elbowed rod 27 is pivoted so as to bring the said rod into the position which is illustrated in FIG. 9 and in which the bottom portion of the rod remains locked inside the clip body, whereas the top portion of the said rod is accordingly engaged in the transverse slot 22 (shown in FIG. 1) of the strip 21.

The tightening of the nut 29 (or 30) then has the effect both of clamping the element A inside the clip and, at the same time, of clamping the said clip on the one hand against the bottom face of the head 5a of the fixing pin 5 and on the other hand, against the wall P by virtue of the anchoring teeth 23.

It will be noted that in this arangement, the fastening clip is also capable of clamping elements A having fairly different diameters.

It is obvious that the example of construction of the new fastening clip which has been described in the foregoing and illustrated in the accompanying drawings has been giving solely by way of indication and not in any sense by way of limitation, and that any modification of detail can be made in the said example without thereby departing either from the scope or the spirit of the present invention.

What I claim is:

1. Means for attachment by fastening-clip for the mounting on a wall of piping systems in the class of water conduits, gas pipes, tubes for electric conductors, insulated electric conductors, ironclad electric conductors, said means comprising: a fixing member having at least one retaining head and a pin intended to be driven into said wall; a strip which is deformable and curved in the shape of an S, the top curved portion of which is intended to receive the piping to be mounted, and which is provided near its extremity with a slot while the intermediate portion and bottom portion of said strip are provided with orifices for the purpose of inserting the pin of the fixing member and with a central hole located between said orifices; and means for closing and clamping, consisting of a pivoting elbowed rod one arm of which is provided with retaining means and is engaged inside said central hole, while the other arm, which is adapted to be engaged in the slot of the top extremity of the S, is threaded and fitted with a tightening nut intended to be applied against the top extremity of the S-shaped strip.

2. Means for attachment as claimed in claim 1, in which the bottom portion of the S has an angular shape and presents a small face in which is formed the central hole for the elbowed rod, said small face being intended to occupy a position which is substantially at right angles to the surface of the wall on which the piping is intended to be mounted.

3. Means for attachment as claimed in claim 1, in which the bottom extremity of the strip which is bent into an S is turned down at the exterior and provided with anchoring teeth.

4. Means for attachment as claimed in claim 1, in which the opening formed in the bottom portion of the strip bent into the shape of an S is an oblong orifice for the purpose of freely inserting therein the head of the fixing member, while the opening formed in the intermediate portion of said strip is a button-hole slot providing a means for freely inserting the pin of the fixing member and having an extremity which permits the insertion of the head of said fixing member.

5. Means for attachment as claimed in claim 1, in which the arm of the elbowed rod engaged inside the central hole of the S-shaped strip is provided with retaining ears while said hole is provided with notches permitting the insertion of said ears.

6. A closing means as claimed in claim 1, in which that arm of the elbowed rod which is engaged inside the central hole has a length such that said arm can come into abutment with the fixing member so as to prevent the accidental disengagement of the S-shaped strip.

7. Means for attachment as claimed in claim 1, in which the fixing member is provided, beneath the retaining head, with an annular flange which is integral with the pin and forms a second head intended to limit the depth of penetration of said fixing member in the wall at least one of the two heads having a position which can be varied along the length of the pin.

8. Means for attachment as claimed in claim 7, additionally comprising a washer which is engaged over the pin so as to serve as a support for the annular flange.

9. Means for attachment by fastening-clip for the mounting on a wall of piping systems in the class of water conduits, gas pipes, tubes for electric conductors, insulated electric conductors, ironclad electric conductors, said means comprising: a strip which is bent so as to have a portion curved substantially over a semi-circumference and intended to form a clip for the purpose of holding the piping to be mounted, a flat intermediate portion forming a small face folded substantially at right angles with respect to the zone which is adjacent to the curved portion, and another flat portion forming a base folded substantially at right angles with respect to said small face and the free end of which is turned down at the exterior and provided with anchoring teeth, said small face being pierced with a hole, said base being provided with an oblong orifice, and the portion curved over a semi-circumference being provided on the one hand with a button-hole slot disposed vertically above with respect to said oblong orifice and, on the other hand, with a transverse slot near the free extremity of said curved portion; a fixing member comprising a retaining head and a pin intended to be driven into the wall, said pin passing through the oblong orifice and the button-hole slot while said retaining head is applied against that portion of the strip which is curved over a semi-circumference; and means for closure and clamping of that portion of the strip which forms a clip, said closing and clamping means consisting of an elbowed rod, one arm of which is engaged inside the hole of the small face and the other arm of which is capable of being engaged inside the transverse slot of said strip as a result of the pivotal movement of said elbowed rod and is threaded so as to be fitted with a nut.

10. A fastening clip for the mounting on a wall of piping systems in the class of water conduits, gas pipes, tubes for electric conductors, insulated electric conductors, ironclad electric conductors, by means of a fixing member having at least one retaining head and a pin intended to be driven into said wall, comprising one strip which is deformable and curved in the shape of an S, the top curved portion of which is intended to receive the piping to be mounted and is provided, near its extremity, with a slot while the intermediate portion and the bottom portion of said strip are provided with orifices for the purpose of inserting therein the pin of said fixing member and with a central hole located between said orifices; and closing and clamping means consisting of a pivoting elbowed rod, one arm of which is provided with retaining means and is engaged in said central hole, while the other arm which is capable of being engaged inside the slot of the top extremity of the S is threaded and provided with a tightening nut intended to be applied against the top extremity of said S-shaped strip.

References Cited in the file of this patent

UNITED STATES PATENTS

| | | |
|---|---|---|
| 644,080 | Huebel | Feb. 27, 1900 |
| 1,126,845 | Overn | Feb. 2, 1915 |
| 2,071,219 | Reis | Feb. 16, 1937 |